United States Patent [19]
Vecchiarelli

[11] 3,902,942
[45] Sept. 2, 1975

[54] METHOD OF MAKING FINISHED METAL SHEET WITH REMOVABLE PROTECTIVE COVERING

[75] Inventor: Frank Vecchiarelli, Riveredge, N.J.

[73] Assignee: Revere Copper and Brass, Incorporated, New York, N.Y.

[22] Filed: Dec. 28, 1973

[21] Appl. No.: 429,621

Related U.S. Application Data
[62] Division of Ser. No. 158,153, June 30, 1971, Pat. No. 3,783,087.

[52] U.S. Cl. .................. 156/145; 29/424; 156/209; 156/219; 156/292
[51] Int. Cl. ...................... A63b 39/00; B32b 31/00
[58] Field of Search.................... 161/127, 131, 406; 156/210, 145, 278, 290, 292, 219, 220, 289; 29/424

[56] References Cited
UNITED STATES PATENTS

| | | |
|---|---|---|
| 2,633,442 | 3/1953 | Caldwell .......................... 161/127 X |
| 2,744,624 | 5/1956 | Hoogstoel et al. ............ 161/406 UX |
| 3,358,355 | 12/1967 | Youssi et al. .......................... 29/424 |

*Primary Examiner*—Charles E. Van Horn
*Assistant Examiner*—David A. Simmons
*Attorney, Agent, or Firm*—Pennie & Edmonds

[57] ABSTRACT

The finished surface of a metal sheet is protected with a removable film of thermoplastic material bonded to the finished surface along a grid-like pattern of lines that form hermetic seals for a plurality of discrete gas pockets between the finished metal surface and the film. The product is formed by preheating the metal to bonding temperature, by then bringing a discrete film of thermoplastic material into contact with the finished surface, and by pressing the film against the heated metal surface with a resilient pattern of ridges to form the aforesaid pattern of seal lines.

1 Claim, 4 Drawing Figures

PATENTED SEP 2 1975　　　　　　　　　　　　　　　　　　3,902,942 ns of 3,902,942

METHOD OF MAKING FINISHED METAL SHEET WITH REMOVABLE PROTECTIVE COVERING

This is a division of application Ser. No. 158,153, filed June 30, 1971, now U.S. Pat. No. 3,783,087.

This invention relates to the protection of finished metal surfaces with a removable covering.

Metal products having flat surfaces provided with a decorative finish must frequently be provided with a removable protective covering to insure against fretting corrosion when the products are stacked or nested during shipment or to insure against abrasive damage when the products must be subjected to mechanical deformation. An example of the former is flat sheets of metal provided with at least one decorative finish surface and which are shipped in stacked groups, and an example of the latter is a coil of painted metal siding stock which is mechanically deformed by the siding producer to form his individual design for interlocking edges when the siding panels are installed.

It has been common practice, as represented by U.S. Pat. No. 3,358,555, to protect such sheet metal surfaces with a removably bonded film of material which is made to adhere completely to the finished metal surface by means of an adhesive or by heat-bonding of a thermoplastic film material directly to the metal surface, the latter being effected either by extruding the material directly onto the sheet or by passing the film and sheet between pressure rolls. Such films generally offer only minimum protection for the finished metal surface because the cost of the film material dictates the use of as thin a film as possible compatible with its usage. These films are usually stretched beyond their limit during metal deformation where the film, positioned on the outside of the finished surface being deformed, is loosened by this stretching and is then torn by the working forces between the finished metal surface and the forming die.

I have now found that a thin film of thermoplastic covering material can be made significantly more protective of the finished surface of a metal sheet if it is bonded to the metal surface only along a grid-like pattern of continuous lines which form hermetic seals for a plurality of discrete gas pockets between the finished surface of the metal and the thermoplastic film. This protective covering can be obtained by heating the metal sheet to a suitable bonding temperature for the thermoplastic film material, by brining a discrete film of said thermoplastic material into contact with the finished surface of the metal, and by then pressing the film of thermoplastic material against the heated metal surface with a grid-like pattern of resilient interconnecting ridges so as to effect bonding of the thermoplastic material to the metal surface substantially only along said pattern.

These and other novel features of the invention will be more readily understood from the following description taken in conjunction with the accompanying drawing in which FIG. 1 is a schematic view of apparatus for carrying out the method of this invention;

Figure 1:
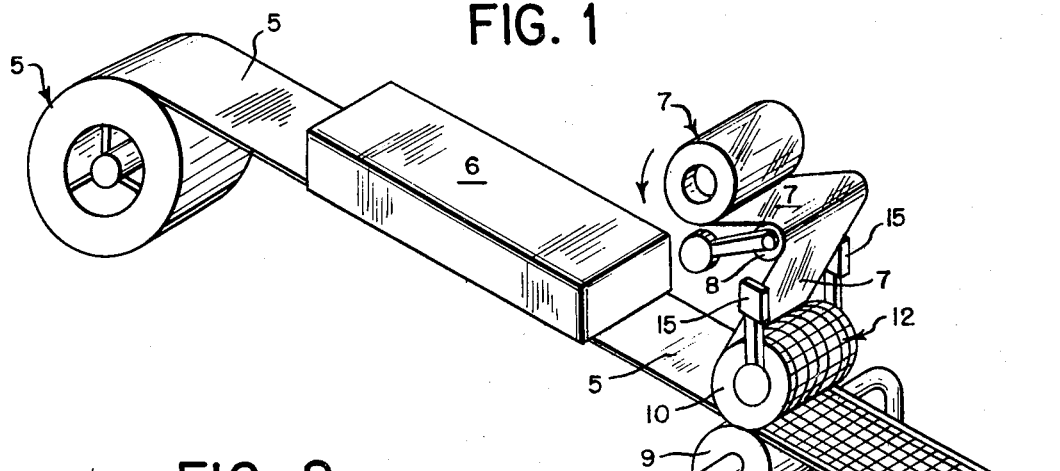

As shown in FIG. 1, most of the apparatus used in practicing the invention is conventional. A roll of metal sheet 5 such as aluminum for building siding, is supported so that as it is unrolled the sheet can pass through a heater 6. The heater can be of the radiant type, or it can comprise a pair of heated rolls making contact with opposite surfaces of the sheet, or a combination of both. The heating should be sufficient to raise the temperature of the metal to a value at which it will effect bonding thereto of the thermoplastic sheet material which is used as the protective film. A roll of this thermoplastic sheet material 7, such as polyethylene, cellulose acetate, polyvinyl chloride, polystyrene, nylon, and the like, supplies a web of film over a conventional take-up roll 8 to the nip of a pair of rolls comprising a backing 9 and a pressure roll 10. As these rolls, the thermoplastic film 7 is brought into contact with the metal sheet 6, and this contact is effected with the finished surface of the metal sheet, e.g. its polished, painted, or otherwise decorated surface, facing the thermoplastic film. The backing roll 9 supports the surface of the metal sheet which is not being covered in this operation, and this surface of the roll can be advantageously but not necessarily heated by a conventional fluid heat circulating system 11.

Figure 2:
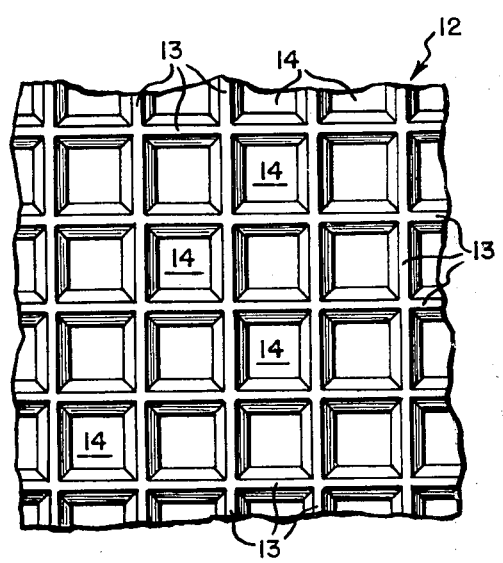
FIG. 2 is an enlarged fragmentary view of a portion of the surface of the resilient roll that provides the grid-like band pattern in the protection covering film.
Figure 3:
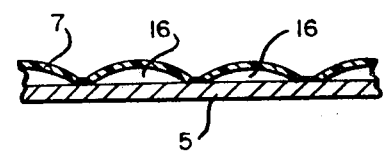
FIG. 3 is a partial sectional view of the product of the invention.

The pressure roll 10 which presses the film of thermoplastic film against the finished surface of the heated metal sheet 5 is composed of a resilient release material such as silicone rubber, butyl rubber, or the like, and is characterized, as shown in FIG. 2, by a surface 12 composed essentially of a pattern of intersecting grid-like ridges 13 with a hollow space 14 between each set of interconnected ridges. Inasmuch as the pressure roll is forced against the exposed surface of the thermoplastic film by hydraulic cylinders 15, or by springs or the equivalent, the resilient ridges of the pressure roll instantly conform to any minor irregularities in the contour of the film-metal sheet composite and serve to hermetically trap the air initially present as the film and metal sheet are brought together. The grid-like pattern of these ridges breaks the trapped air into a multiplicity of discrete gas pockets or bubbles 16, as shown in FIG. 3, by the bond obtained between the thermoplastic film 7 and the finished surface of the heated metal strip 5 along the pattern of the pressure-roll ridges.

The aforementioned pattern of discrete gas pockets or bubbles, hermetically sealed between the thermoplastic film and the finished surface of metal sheet, produce a wholly different kind of protection for this finished surface than is provided with a conventional flat film of the same thermoplastic film in complete surface-to-surface contact with the metal surface. With respect to fretting corrosion of flat metal sheets provided with the protective covering of the present invention, the multiplicity of discrete gas pockets or bubbles resiliently support the adjacent superimposed metal surface of another sheet of metal and this resiliency, both laterally and in compression, allows the superimposed metal sheet to float on the bubbles rather than rub against, and quickly wear through, a fixed surface film as in prior art film coverings. With respect to protection against abrasion damage to the finished metal surface during deformation of the metal sheet, say to form an interlocking longitudinal edge portion for building siding, the gas pockets or bubbles not only similarly serve to provide resilient protection between the finished metal surface and the forming die but also provide, in the form of the domed portion of each pocket, a portion of the thermoplastic sheet which is not bonded to the metal surface and is therefore free to stretch as the metal sheet is bent convexly with respect to its finished surface. The resulting action of the gas pockets or bubbles is to cushion and also to lubricate the contact between the forming die surface and the finished surface of the metal sheet, as contrasted to prior films which, because they are fully bonded to the finished metal surface, are quickly broken by the frictional force of the die surface and thus leave the finished metal surface exposed to abrasion.

It will be understood, accordingly, that the thermoplastic film which is to be bonded to the finished metal surface pursuant to the invention, must be supplied in the form of a discrete film before it is brought into contact with the metal surface. Thus, the thermoplastic film cannot be extruded directly onto the surface of the metal, nor can it be applied as a liquid film which subsequently hardens to a protective covering. The film must have a discrete form prior to being applied to the metal surface so that it will have the opportunity of entrapping air, or other ambient gas, between the film and the metal surface to which it is applied in order for the ridged resilient pressure roll to produce the hermetically sealed gas pockets or bubbles between the bonded areas of the film and the metal surface.

Figure 4:
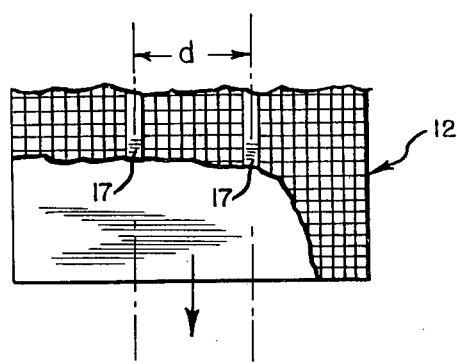
FIG. 4 is an enlarged fragmentary view of a portion of siding strip coil stock capable of being slit longitudinally to obtain a plurality of siding strips embodying the invention.

The portion of the film which is sealed to the metal surface pursuant to the invention should be at least about 30% of the total surface area of the film material in order to insure adequate protection to the metal surfaces. In practice, it has been found advantageous to have 50 to 60% of the total area of the film secured to the metal surface, this portion of the film corresponding approximately to the ratio of the surface area of the ridges 13 to the total area of the film material 7. Under these conditions, the area of the film material secured to the metal surface is sufficient to hold the film in place and the remainder of the film area, which defines the gas pockets or bubbles 16, is sufficient to provide the cushioning and stretching attributes characteristic of the protective film of the present invention.

Where it is desired to provide the resilient protective covering of the invention over the finished surface of a coil of strip metal which will subsequently be slit longitudinally to form two or more narrower strips for siding or other purpose, it has been found advantageous, as shown in FIG. 4, to provide the surface 12 of the resilient pressure roll 10 with circumferential land portions 17, at the surface level of the ridges, and spaced from one another by a centerline distance $d$ which corresponds to the width of the narrower strips. The resulting roll design produces the type of protective covering of the invention shown in FIG. 4 wherein the film is fully bonded to the metal surface along a path which straddles the ultimate slitting line, i.e. the centerline of the land portions 17. When the metal is subsequently slit, the edge portions of the protective film will be fully adhered to the finished surface of the metal strip so that it cannot be pulled off inadvertently. The same concept can, of course, be applied to the edge portions of a strip of metal which is not to be slit. In either event, it will be appreciated that the resilient protective covering of the invention will protect the finished surface of the metal strip while it is being handled or if it is shipped in the coiled form.

Although the protective film of thermoplastic material is bonded to the finished metal surface only along the pattern corresponding to the ridges of the pressure roll, it has been found that the film adheres as effectively to the metal surface as if it were a completely surface-to-surface bond as in prior art coverings. On the other hand, the film is readily peeled from the metal surface without the use of any tool. A further advantage of the protective covering of the invention, from an aesthetic point of view, is that it can be applied as described without forming wrinkles or isolated areas of non-bonding which frequently result when a film of similar material is bonded in full surface-to-surface contact.

It is claimed:

1. A method of providing a finished surface of sheet metal with a removable protective covering of thermoplastic material, said process comprising:
   a. heating the sheet metal to a temperature sufficiently high to effect thermal bonding between the finished surface of the sheet metal and the film of thermoplastic material;
   b. bringing a discrete film of said thermoplastic material into contact with the finished surface of the sheet metal heated in step (a);
   c. pressing the film of thermoplastic material between the heated finished surface of the sheet metal and the surface of a resilient material having a grid-like pattern of interconnecting ridges to effect thermal bonding between the finished surface of the sheet metal and the thermoplastic material substantially only along said grid-like pattern, the area of the film material bonded to the metal sheet along the grid-like pattern of lines being 50 to 60 percent of the total surface of the film material and forming hermetic seals for a plurality of discrete gas pockets between the finished surface of the sheet metal and the thermoplastic film.

* * * * *

UNITED STATES PATENT AND TRADEMARK OFFICE
CERTIFICATE OF CORRECTION

PATENT NO. : 3,902,942
DATED : September 2, 1975
INVENTOR(S) : Frank Vecchiarelli It is certified that error appears in the above-identified patent and that said Letters Patent are hereby corrected as shown below:

Col. 1, line 49, "brining" should read --bringing--.

Col. 2, line 20, "As" should read --At--.

Signed and Sealed this twenty-fifth Day of November 1975

[SEAL]

Attest:

RUTH C. MASON
Attesting Officer

C. MARSHALL DANN
Commissioner of Patents and Trademarks